United States Patent
Bethke et al.

(10) Patent No.: US 6,464,066 B2
(45) Date of Patent: Oct. 15, 2002

(54) CONVEYOR ASSEMBLY WITH PALLET COUPLING

(75) Inventors: Scott P. Bethke, Howell; Brian R. Dana, Corunna; Frank A. Stone, Macomb Township, all of MI (US)

(73) Assignee: Inno-veyor, Inc., Livonia, MI (US)

( * ) Notice: Subject to any disclaimer, the term of this patent is extended or adjusted under 35 U.S.C. 154(b) by 0 days.

(21) Appl. No.: 09/825,264

(22) Filed: Apr. 3, 2001

(65) Prior Publication Data

US 2001/0030111 A1 Oct. 18, 2001

Related U.S. Application Data

(60) Provisional application No. 60/194,654, filed on Apr. 4, 2000.

(51) Int. Cl.$^7$ .............................................. B65G 35/06
(52) U.S. Cl. .................................... 198/465.1; 198/795
(58) Field of Search ........................... 198/465.1, 580, 198/795

(56) References Cited

U.S. PATENT DOCUMENTS

| | | | | |
|---|---|---|---|---|
| 2,789,683 A | * | 4/1957 | Stahl ........................ | 198/465.1 |
| 3,338,382 A | * | 8/1967 | Fogg ........................ | 198/465.1 |
| 3,848,726 A | * | 11/1974 | Wiemer .................... | 198/465.1 |
| 4,088,220 A | * | 5/1978 | Jacksch et al. ............. | 198/472 |
| 4,498,397 A | * | 2/1985 | Fuchs et al. ................ | 198/472 |
| 4,667,804 A | * | 5/1987 | Dubuit et al. ............... | 198/345 |
| 4,699,266 A | * | 10/1987 | Weiss ....................... | 198/803.2 |
| 5,222,587 A | * | 6/1993 | Chevalier et al. ......... | 198/465.1 |
| 5,454,149 A | * | 10/1995 | Buggle et al. ........... | 198/465.1 |
| 5,590,756 A | * | 1/1997 | Zaguroli, Jr. ................ | 198/795 |
| 5,735,384 A | * | 4/1998 | Lingo et al. .............. | 198/465.1 |
| 5,975,280 A | * | 11/1999 | Cote et al. ............... | 198/474.1 |
| 6,047,813 A | | 4/2000 | Herzog et al. | |

* cited by examiner

*Primary Examiner*—Douglas Hess
(74) *Attorney, Agent, or Firm*—Brooks & Kushman P.C.

(57) ABSTRACT

An endless roller chain conveyor of the over/under type supporting carriers or pallets which independently travel along the horizontal runs of the conveyor upon demand, while the roller chain is allowed to continuously run at a constant speed. The chains are commercially available multi-strand roller chain. The carriers or pallets may be stopped and held along the horizontal runs of the conveyor (both top and bottom) using mechanically driven stop assemblies located at required load, unload, holdback, or workstation positions assigned to the particular application. The carriers or pallets are driven on the roller chains by way of guide sprockets, alignment bars, and support rollers. The guide sprockets are attached to an adjustable clutch assembly of the type, which allows for adjustment of the rolling resistance to accommodate the particular load requirements of the specific application for a particular machine. When the carriers or pallets are too short for the designated load to be placed upon them, then often the carrier or pallets will need to be linked or joined together to provide a surface of sufficient length to accommodate the load. The conveyor, when this feature is required, shall automatically couple carriers or pallets together for the loaded side of the conveyor and allow for the pallets to be uncoupled during transport around the terminal ends and the empty return side of the conveyor.

14 Claims, 4 Drawing Sheets

US 6,464,066 B2

CONVEYOR ASSEMBLY WITH PALLET COUPLING

CROSS-REFERENCE TO RELATED APPLICATIONS

This application claims the benefit of U.S. provisional application Serial No. 60/194,654 filed Apr. 4, 2000.

BACKGROUND OF THE INVENTION

1. Field of the Invention

The present invention relates to a conveyor assembly and a method of conveying pallets in which the pallets have the ability to couple together in groups of two or more for accepting product of greater length than the individual pallets, and the ability to uncouple for transporting at the terminal ends of the conveyor.

2. Background Art

In order to carry items which are larger than a single pallet, prior art conveyor assembly designs rely upon permanent linking or hinging of carrier or pallets by a variety of types of link bars, which create a permanent grouping of carriers or pallets to carry the large items. This method can be problematic with conveyor designs requiring friction-type terminal transfer of the pallets (i.e., pallet drive mechanisms which require static frictional engagement of surfaces to move the pallets along the chain, and around the sprockets at terminal ends of the chain). As the weight of the pallets increases due to the size of each pallet and the attached tooling or nest fixtures, as well as the hinging of multiple pallets, the subject wear of those designs relying upon friction becomes critical. When wear occurs, the pallets may slip when traveling around the terminal end of the chain drive, which may result in "slamming" of pallets traveling from top to bottom, and pallets not having sufficient friction to travel through the terminal end to raise the pallet from the lower level to the upper level of the chain drive mechanism.

Accordingly, it is desirable to provide an improved conveyor system in which large products may be transported along the conveyor system, and in which the weight supported by the friction drive mechanisms is reduced to prevent slipping of pallets around the terminal ends of the chain drives.

SUMMARY OF THE INVENTION

It is an object of this invention to overcome the limitations of the prior designs and provide the user of the invention the ability to couple pallets when the product being transported over the conveyor demands so, but allowing the pallets to be uncoupled during other operations of the conveyor. The invention eliminates the concern of linkage binding and allows for more flexibility in design. Such flexibility includes the option of carrying parts which may require single pallets or varying numbers of coupled pallets on demand of the control system.

The carrier or pallets are fitted with sprockets which provide resistance to the chains by means of adjustable clutches and alignment bars which prevent skewing of the carrier or pallets beyond an acceptable tolerance. The sprockets are engaged on the bottom side of the upper multi-strand roller chain and the alignment bars are riding on the top side of the upper multi-strand roller chain.

The multi-strand roller chain is driven by a pair of drive sprockets located at the drive end of the conveyor. At the opposing end of the conveyor similar sprockets act as idler and/or take up sprockets to allow for proper tensioning of the multi-strand roller chain.

Attached to each sprocket is a disc containing rollers of like type and material as the multi-strand roller chain. The disc maintains a matching pitch of the driven and the idler sprockets. The distance between the circumferential pitch diameter of either type of sprocket and the roller disc is such to allow for the carrier or pallet sprocket to become "trapped" between the two during the transfer around the terminal ends of the conveyor.

The alignment bars on either side of the carrier or pallet maintain correct orientation of the carrier or pallet during the engagement of the sprockets in the terminal transitions.

Pallet groups which require coupling to provide a longer pallet "train" will be fitted with coupling hardware to allow for the automatic coupling of groups of pallets at the loading stop of the conveyor.

The lead pallet in each group of pallets to be coupled has a pair of coupling pivot arms attached to the underside of the pallet top. The pallets following (those intended for coupling) are fitted with a receiving plate which engage with the pivot arm on contact in the load stop station and cause the coupling of the pallets. This coupling may continue for any number of pallets, provided that there is sufficient length at the stop station.

In another embodiment, the pivot arms are spring-loaded.

After coupling up and releasing, the group will travel as one along the length of the conveyor unless stopped by another pallet (creating an accumulation of pallets) or when encountering a stop.

The group may be kept coupled by the use of a keeper rail running the length of the conveyor, which traps the pivot arm large roller and thus prevents the inadvertent release of any single pallet from the train.

When the coupled group of pallets is stopped at the unload station, the group remains coupled together. After being released, the pallets advance. As they do, the pallet pivot arms individually disengage as they roll over a decoupling ramp. After the pallets are decoupled, each will act as an independent pallet at the terminal transfers as well as the empty return of the conveyor.

The above object and other objects, features and advantages of the invention are readily apparent from the following detailed description of the best modes for carrying out the invention when taken in connection with the accompanying drawings.

DETAILED DESCRIPTION OF THE PREFERRED EMBODIMENT(S)

In the following detailed description, certain specific terminology will be employed for the sake of clarity and particular embodiments in accordance with 35 U.S.C. §112, but it is understood that the same is not intended to be limiting and should not be so construed inasmuch as the invention is capable of taking many forms and variations within the scope of the appended claims.

Figure 1:
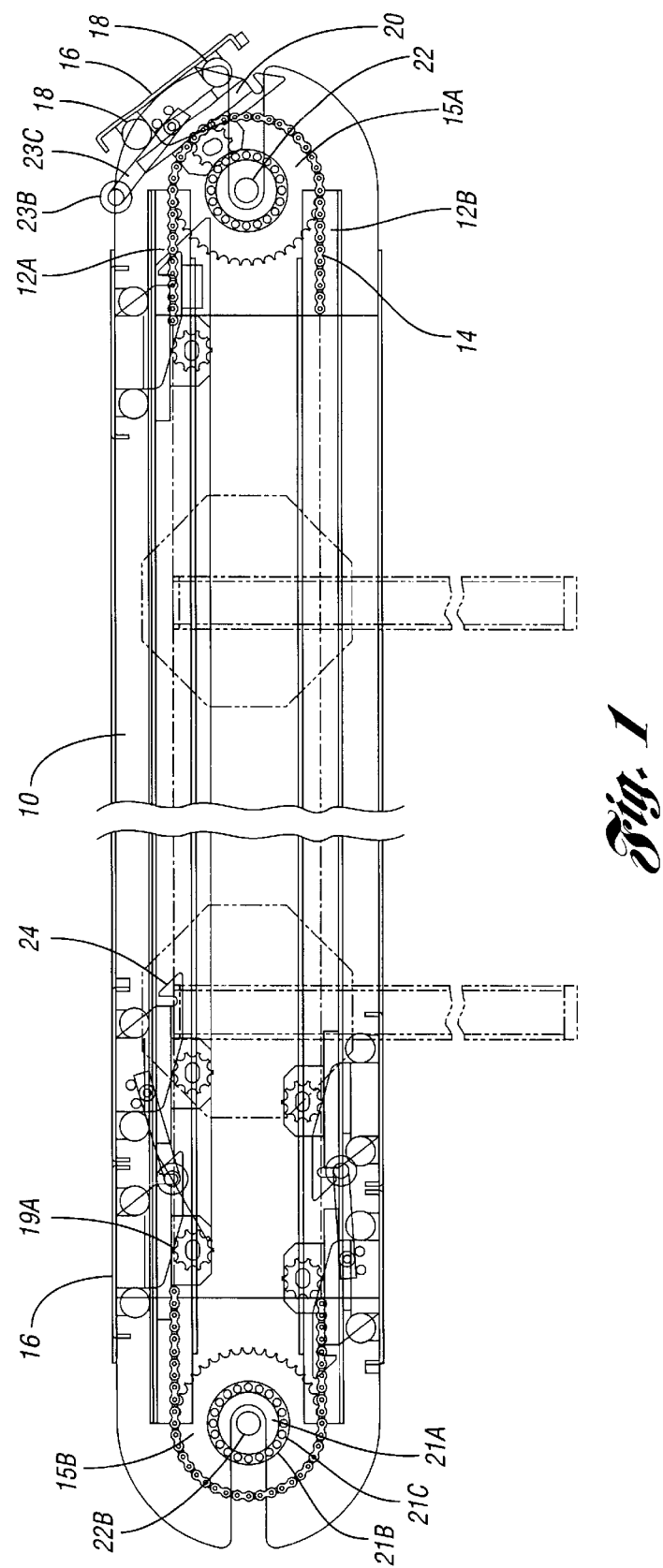
FIG. 1 is a side elevation view of an over/under chain driven accumulating pallet conveyor according to the present invention.
Figure 2:
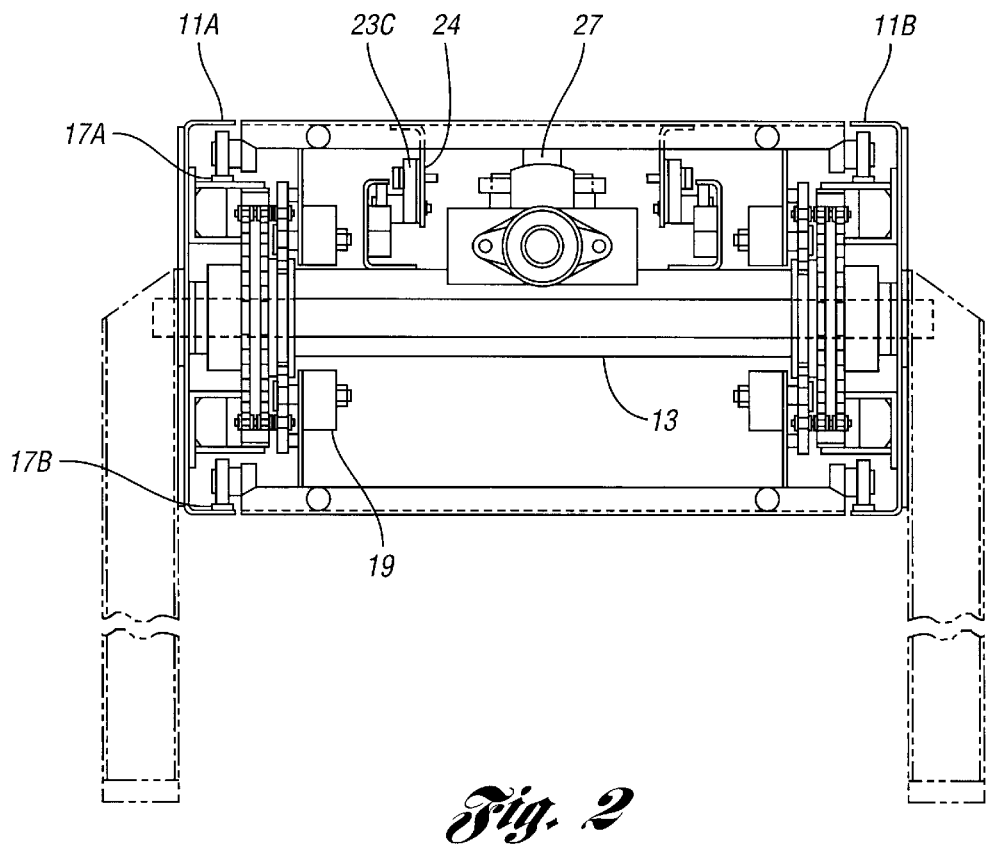
FIG. 2 is a sectional view of the drive terminal end of the conveyor shown in FIG. 1.

Referring to the drawings, FIGS. 1–2 illustrate a conveyor 10 according to the present invention which includes the conveyor side frames 11A, 11B, multi-strand roller chain support and guide rails 12A, 12B, conveyor cross members 13, multi-strand roller chain 14, roller chain sprockets 15A, 15B, shafts 22A, 22B, and pallet assemblies 16. If the pallets move across the upper guide rail 12A from left to right as viewed in FIG. 1, the sprocket 15B is considered the terminal end of the conveyor. The sprocket 15A is the drive sprocket and the sprocket 15B is the driven sprocket. The conveyor 10 also includes loading station 8 and an unloading station 9, where the pallets are loaded and unloaded, respectively.

Each of the roller chain guide rails 12A, 12B incorporate a runner bar 17A, 17B upon which the pallet guide rollers 18 travel along the horizontal runs of the conveyor. The wheels 18 transport the majority of weight load of the pallet, which reduces the carrying load of the multi-strand roller chain 14.

Figure 3:
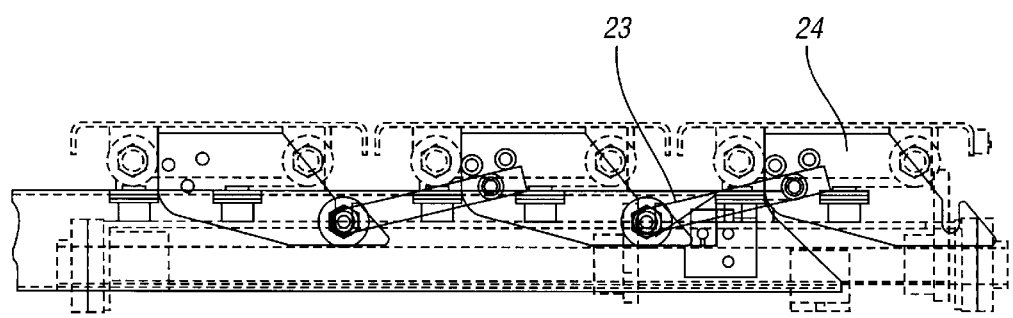
FIG. 3 is a partial side view of linked pallets on the conveyor of FIG. 2, and illustrates the pallet pivot arm and the pallet coupling engagement plate.

Refer to FIG. 3 for a detailed illustration of a first embodiment of the pallet pivot arm assemblies 23 and the engagement plates 24. This Figure shows a train of linked pallets P, wherein the pivot arms 23 are coupled to the engagement plates 24.

Figure 4:
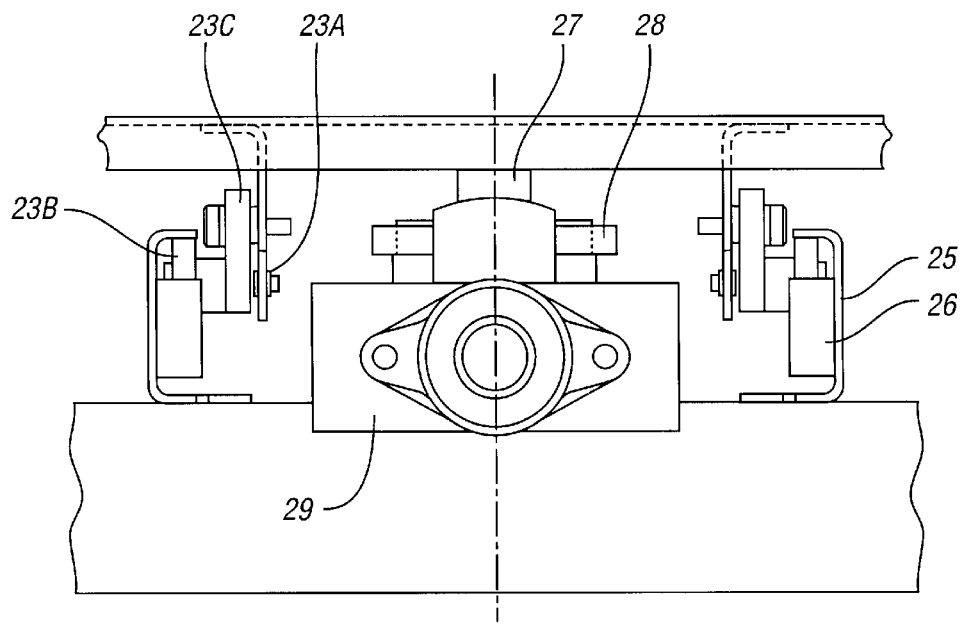
FIG. 4 is an enlarged end view taken from FIG. 2 and illustrating the pivot arm large wheel trap channel.

Refer to FIG. 4 for a detailed illustration of the pivot arm wheel capture channels 25A of the first embodiment.

Figure 5:
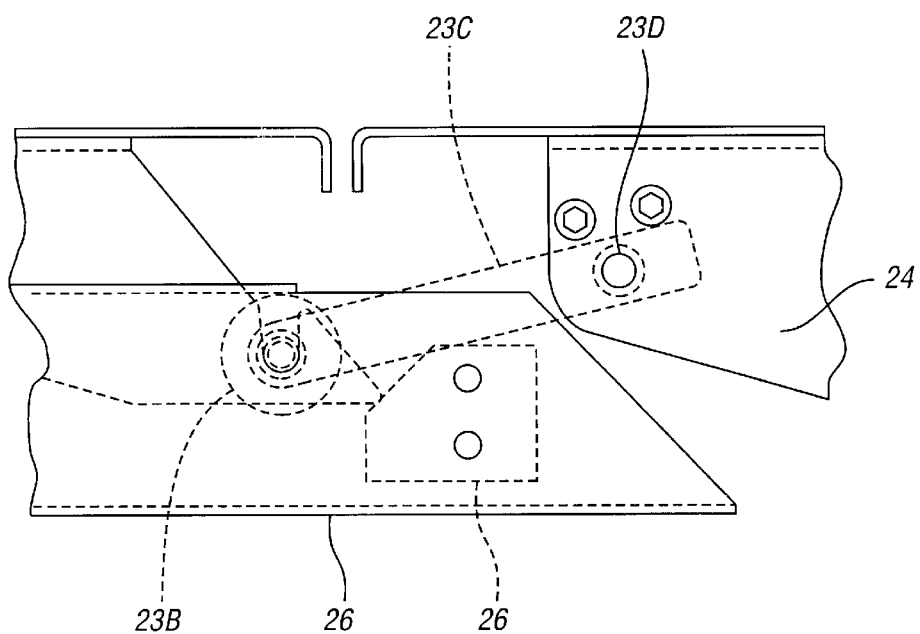
FIG. 5 is an enlarged side view of the channel uncoupling ramps taken from FIG. 3.

Refer to FIG. 5 for a detailed illustration of the pivot arm wheel capture channels and the decoupling ramps 26 of the first embodiment. The wheel 23B engages the ramp 26A for decoupling of adjacent pallets P, as described below.

Figure 6:
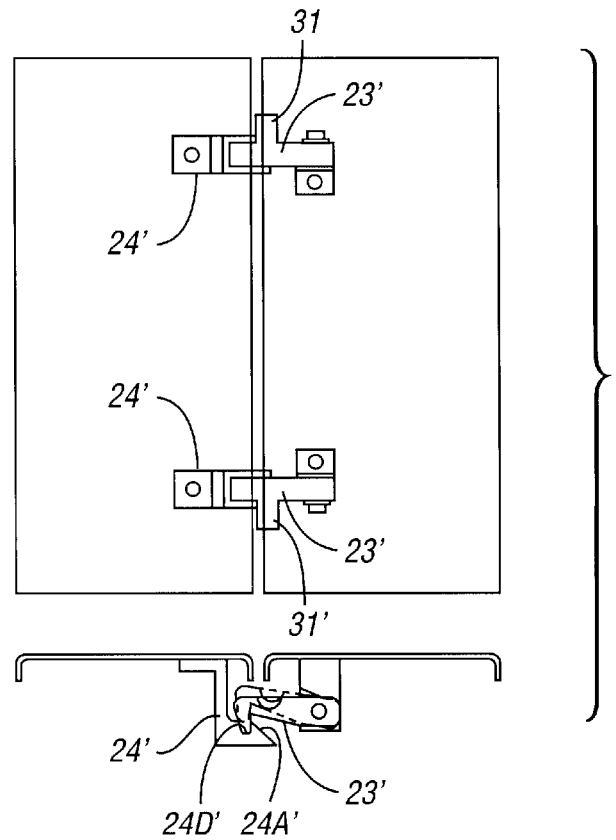
FIG. 6 show a top elevational view and a side view, respectively, of pivot arms and receiving targets of adjacent pallets according to a second embodiment of the invention.

Refer to FIGS. 6a and b for a detailed illustration of the pallet pivot arm assemblies 23' and the engagement plates 24' of a second embodiment.

Figure 7:
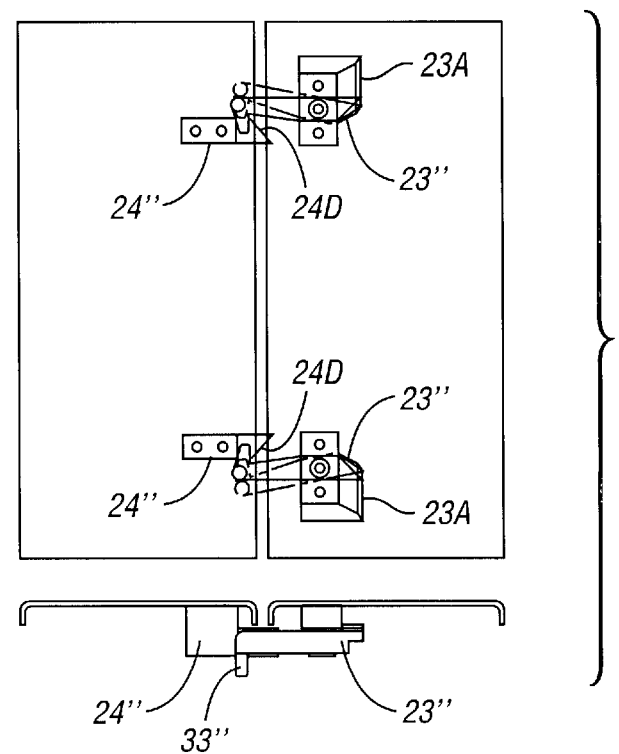
FIG. 7 show a top elevational view and a side view, respectively, of pivot arms and receiving targets of adjacent pallets of a third embodiment of the invention.

Refer to FIG. 7 for a detailed illustration of pallet pivot arm assemblies 23" and engagement plates 24" of a third embodiment, wherein the pivot arms are engaged by spring-bias, rather than by gravity.

As the pallet assemblies 16 are entering the terminal end of the conveyor 10, the clutch/sprocket assemblies 19 are engaged in the multi-strand roller chain 14 and become entrapped between the roller chain 14 and the roller disc 21 assembly.

The action of the individual sprocket teeth on the sprocket assembly 19 with the roller 21C riding in the pin 21B which is contained in the disc body 21A is a rolling motion which maintains positive engagement of the sprocket assembly 19, while minimizing the wear of the sprocket, roller disc and chain.

The design of the roller disc 21 establishes a rolling contact during the engagement of the sprocket 19 assembly because of the matched pitch diameters of the complimenting units.

The drive 15A and idler sprockets 15B and the complimentary roller disc assembly 21 are centered about the centerline of their respective shafts 22A, 22B to maintain the concentric relationship to one another as well as matching the pitch diameters of each radial about the centerline.

The clutch/sprocket assemblies 19 allows the pallet to travel at the chain travel rate on the multi-strand roller chain 14 as the clutch provides rolling resistance on the sprocket engaged in the roller chain 14. This action will continue until either a stop is energized or a proceeding pallet stops and requires that accumulation is necessary. In either case, the clutch assembly allows sufficient slippage with regard to the sprocket that the chain 14 freewheels beneath the guide bar 20 and the sprocket 19A.

When pallets are required to be coupled, the lead pallet of each group is stopped at the load stop station 8. When the following pallet enters the station, upon contact with the first pallet, the lead pallet pivot arm assemblies 23 encroach upon the second pallet's engagement plate 24 causing the roller 23A to ride up the lead ramp 24A of the engagement plate 24 and, as acted upon by gravity, the roller 23A falls into the curved slot 24D of the plate 24.

In the second embodiment of FIGS. 6a and 6b, the pivot arm 23' rides up the lead ramp 24A' and falls into the curved slot 24D' of the plate 24'.

In the first embodiment, the pivot arm 23 is comprised of the small roller 23A, the large guide roller 23B, the pivot arm 23C, the pivot arm bushing 23D, the roller retainer clips, and mounting hardware.

In the third embodiment of FIGS. 7a and 7b, upon engagement with the first pallet, the lead pallet assemblies 23" open horizontally against the second pallet's engagement plate 24" causing the pivot arm to ride up the lead ramp 24D" of the engagement plate 24" and as acted upon by spring tension of the pivot arm spring 23A fall into the slot of the plate 24".

After the pallets are coupled (more individual units may be coupled depending on the required overall length) the stop is released and the coupled group is allowed to travel along the length of the conveyor 10.

In the first embodiment, the sleeve 25 forms a channel 25A to trap the roller 23B during the transport along conveyor 10. This channel prevents the pallets from uncoupling.

At the end of travel in the first embodiment, the pallets are released at the unload stop where wheel 23B travels to an opening 35 in channel 25A between the lip 37 and the ramp 26A and decouple as they are lifted on ramp 26A which automatically decouples the pallets allowing the pallets to act as single units until the process is repeated.

In the second embodiment, the pallets decouple as the side lugs 31' (shown in FIG. 6a) of the pivot arms are lifted on the ramp 26'.

In the third embodiment shown in FIGS. 7a and 7b, the pallets are released at the unload stop where they travel and decouple as the side lugs 33" of the pivot arms 23" ride onto ramps which automatically decouple the pallets.

The center of each pallet contains a centering guide bar 27 which is used in conjunction with either load or unload rollers 28 which are attached to the stop frames 29. These rollers ensure that the pallets are securely centered in the stop stations requiring the most closely toleranced positioning of the pallets. This guide bar 27 could be eliminated by the use of a v-groove roller for maintaining pallet positioning.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention, as defined in the appended claims.

What is claimed is:

1. A conveyor assembly comprising:

an endless chain engaged with a drive sprocket and a driven sprocket, said chain configured to move a plurality of pallets along guide rails;

each said pallet including a pivot arm selectively engageable by gravity with an attachment feature on an adjacent pallet for coupling pallets, and selectively detachable from the attachment feature by engagement with a release ramp.

2. The conveyor assembly of claim 1, wherein said attachment feature comprises a slot formed in an engagement plate on the adjacent pallet.

3. The conveyor assembly of claim 2, wherein said pivot arm includes a roller which rides up an engagement plate ramp on the engagement plate of the adjacent pallet to facilitate engagement of the roller into the slot when pallets contact each other on the conveyor assembly.

4. The conveyor assembly of claim 2, wherein said pivot arm includes a wheel engageable with the release ramp on a stationary sleeve to pivot the pivot arm for automatically decoupling pallets.

5. The conveyor assembly of claim 4, wherein said sleeve forms a channel to capture the wheel and prevent decoupling.

6. The conveyor assembly of claim 5, wherein the sleeve forms an opening to release the wheel adjacent the ramp on the stationary sleeve.

7. The conveyor assembly of claim 4, wherein said ramp on the stationary sleeve is positioned near the one of said sprockets at a terminal end of the conveyor assembly so that the pallets automatically decouple before the pallets travel around said one of the sprockets before returning the length of the conveyor.

8. The conveyor of claim 1, wherein said pallets are moved by clutch sprockets secured to each pallet.

9. A method of conveying pallets along an endless chain on a conveyor assembly between first and second sprockets, comprising:

engaging each pallet to the chain with a clutch sprocket which is carried by the pallet for selective coupling and decoupling of the pallets with respect to the chain;

providing a pivot arm and an attachment feature at opposing ends of each pallet so that each pivot arm is selectively engageable with an attachment feature on an adjacent pallet for linking together adjacent pallets; and automatically detaching each pivot arm from a respective attachment feature of the adjacent pallets as the pallets approach a terminal end of the conveyor assembly so that each pallet travels individually around the sprocket at the terminal end of the conveyor assembly.

10. The method of claim 9, further comprising:

providing a wheel at a distal end of each pivot arm; and trapping each wheel in a channel as the pallets travel between the first and second sprockets to prevent decoupling of adjacent linked pallets.

11. The method of claim 10, wherein said step of providing a pivot arm and attachment feature at opposing ends of each pallet comprises providing a pivot arm with a roller at a distal end and wherein the attachment feature comprises a slot configured to receive the roller.

12. The method of claim 9, wherein said step of automatically detaching each pivot arm comprises;

providing a release ramp near the sprocket at the terminal end of the conveyor assembly; and engaging a distal end of the pivot arm with the ramp to detach the pivot arm from the respective attachment feature as the pallets approach the terminal end.

13. A conveyor assembly comprising:

an endless chain engaged with a drive sprocket and a driven sprocket, said chain configured to move a plurality of pallets along guide rails;

each pallet including a pivot arm having a roller which is selectively engageable with a slot formed in an engagement plate on an adjacent pallet for selectively coupling and decoupling adjacent pallets; and wherein each pivot arm includes a wheel engageable with a release ramp on a stationary sleeve to pivot the pivot arm for automatically decoupling the pallets.

14. The conveyor assembly of claim 13, wherein said stationary sleeve forms a channel to capture the wheel and prevent decoupling as each pallet travels along the conveyor prior to engagement with said release ramp.

* * * * *